United States Patent [19]

Wedell et al.

[11] 3,994,261
[45] Nov. 30, 1976

[54] ANIMAL EXERCISER AND TRAINER

[76] Inventors: Anders Sten Wedell, Garboesvej 4, Tikob, Denmark, 3080; Ole Mark, Mothsvej 47, Holte, Denmark, 2840

[22] Filed: May 6, 1975

[21] Appl. No.: 574,949

[30] Foreign Application Priority Data

May 9, 1974   Denmark............................ 2535/74

[52] U.S. Cl. ................................................ 119/29
[51] Int. Cl.² ......................................... A01K 29/00
[58] Field of Search............................... 119/29, 22

[56] References Cited
UNITED STATES PATENTS

| | | | |
|---|---|---|---|
| 2,969,768 | 1/1961 | Grant................................... | 119/29 |
| 3,718,120 | 2/1973 | Schwarz et al..................... | 119/29 X |
| 3,824,961 | 7/1974 | Webb.................................... | 119/29 |

Primary Examiner—Hugh R. Chamblee
Attorney, Agent, or Firm—Finnegan, Henderson, Farabow & Garrett

[57] ABSTRACT

An apparatus for exercising and training of animals with a movable floor formed by an endless belt which may be driven with any desired speed, and whereby to enable the floor to simulate as closely as possible, the elasticity and the like physical properties of the natural surface as f.inst. the turf, the upper portion of the belt is supported by and sliding on a smooth plate, and the endless belt is made of a flexible plastic material with a low coefficient of friction, which on the outward side is covered by a coir mat with long upright pile, and the supporting plate resting on rubber blocks.

5 Claims, 1 Drawing Figure

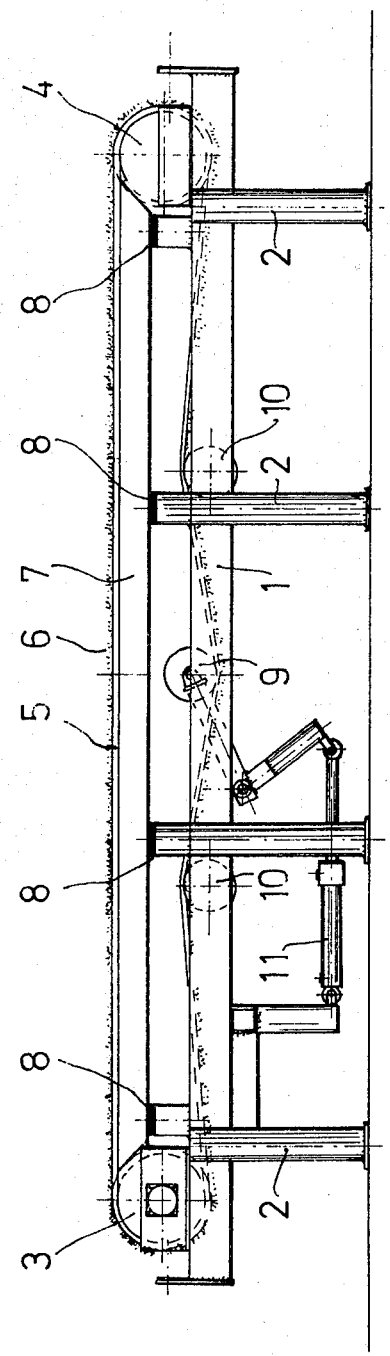

ANIMAL EXERCISER AND TRAINER

BACKGROUND OF THE INVENTION

1. Field of the Invention

This invention relates to an apparatus for exercising and training of animals, especially horses, in a confined space. More particularly, it relates to a preferably horizontal endless belt of flexible material, the upper portion of which is supported by a plate, and at each end of the plate lead over drums of which at least one is driven with an adjustable speed.

2. Description of the Prior Art

By known apparatuses of the kind referred to the endless belt is generally made of rubber, the surface of which is channelled to ensure proper friction between the feet of the animal and the belt, and which within the area where the animal is running generally is supported by a number of closely placed small rollers. These apparatuses, however, have the drawback that the surface on which the animal is running as to its physical properties, in different ways differ from that of the ground f.inst. a turf, on which the animal is normally moving. Firstly, it can even by a close positioning of the supporting rollers not be avoided that they will be sensed through the belt during use of the apparatus and result in a continued unnatural movement of the toe-joints. It has, therefore also been proposed to replace the rollers by a smooth plate on which the belt is sliding.

Secondly, it must be taking into account that a hoof at the moment it hits the ground will have a certain forward movement in relation to the ground. The experience has yielded that by using a rubber-belt notwithstanding the elasticity of the rubber, this relative movement will be stopped too sharply causing unnatural and injurious stress on the toe-joint. In order to obtain optimal result of the training it is of importance that the surface, on which the animal is running has elastic properties corresponding most exactly to those in the nature. Furthermore, it is important that the velocity of the belt can be continuously adjusted quickly and precise.

SUMMARY OF THE INVENTION

It is therefore the object of this invention to provide an animal exercising and training apparatus, wherein the disadvantages mentioned above have been avoided.

Briefly stated, the invention relates to an apparatus of the kind referred to, wherein the surface of the belt is covered by a coir mat with an upright pile of a height of 1-1.5 inch. This material has physical properties, whereby an excellent imitation of a natural ground, f.inst. a turf is achieved, whereby an undesired movement of the toe-joint by the impact is substantially reduced.

This effect may be further improved by proper adjustment of the mass of the supporting plate and the elasticity of the rubber block, on which the plate is resting. Thus during the use the supporting plate will perform limited vibrations, which mau also to some extent reduce the energy consumption by driving the belt.

Further, according to the invention the belt may be driven by a hydraulic motor, whereby an instantaneous and precise adjustment of the speed over a continuous range may be obtained.

BRIEF DESCRIPTION OF THE DRAWING

In the drawing a schematically side-view of an embodiment of the apparatus according to the invention is shown.

DESCRIPTION OF THE PREFERRED EMBODIMENT

Referring to the drawing the apparatus comprises a frame generally designated 1 consisting of horizontal beams and carried by a vertical column 2. When applied to horses the length of the frame will be about 18 feet, and at each end of the frame a drum 3 and 4 respectively is pivotally mounted and an endless belt 5,6 is lead over the drums. The one or both drums may be driven and preferably provided with a rubber covering to increase the friction between the drums and the belt.

The drums may be driven by one or more hydraulic motors, not shown, in a way known per see.

According to the invention the endless belt consists of two layers, of which the inward layer 5 is of a flexible plastic material which, for the reasons stated below, should have a low coefficient of friction. Preferably, this layer consists of polyuretan reinforced by nylon fibres arranged in the longitudinal direction of the belt.

The belt's outward facing layer 6 consists of a coir mat with a high upright pile. Preferably, the height of this pile is to be about 1 - 1.5 inch.

The upper portion of the belt is supported by a plate 7 placed between the drums 3 and 4. Preferably, this plate is made of a concrete slab which, to reduce friction on its upper side is covered by a sheet, not shown, of polished stainless steel, and on which the belt is sliding.

The plate 7 is mounted in the frame 1 by means of rubber blocks 8.

The mass of the plate 7 and the elasticity of the rubber blocks 8 is so adjusted as to provide the apparatus as a whole with a desired characteristic of elasticity.

To ensure necessary friction between the rubber-covered driving drum and the belt, it is of importance that the belt at any movement is held under the proper tension. This is obtained by means of a tension roller 9 positioned between guiding rollers 10 for the lower portion of the belt. The tension roller 9 is forced against the belt by meanss of an hydraulic cylinder 11 acting through an appropriate bell-crank lever as shown in the drawing and with a constant force, which is independent of the load on the belt, as a constant pressure is maintained in the hydraulic system, f.inst. by means of air vessel.

It is to be understood that the form of the invention herewith shown and described is to be taken as a preferred embodiment. Various changes may be made in the shape, size and arrangement of parts. For example, the frame 1 may be suspended so that it may be tilted from the horizontal position, when desired to imitate the run on a slope. Further, the dimension of the apparatus may be changed so that the apparatus may by employed for animals of other size or humans.

What we claim is:

1. Apparatus for exercising and training horses comprising an elongated substantially horizontal framework, a pair of drums pivotally mounted at opposite ends of said framework, driving means for one of said drums, a flexible endless belt carried by said drums and forming upper and lower portions thereof between said drums, a smooth plate underlying and slidably supporting said upper belt portion between said drums, means carried by said frame for resiliently mounting said plate, and means for tensioning said belt including a tension roller, a hydraulic cylinder coupled to said tension roller, and a pair of horizontally spaced guide rollers carried by said frame, said guide rollers and said tension roller acting on said lower belt portion with at least one of said pair of guide rollers and said tension roller being located to elevationally offset said lower belt portion thereby to maintain said belt taut between said drums with a constant tension about said drums, said belt having an inner facing layer of flexible plastic material and an outer facing layer joined to said inner layer, said outer facing layer comprising a coir mat with a high upright pile.

2. The apparatus of claim 1, wherein the pile height of the coir mat is about 1–1.5 inch.

3. The apparatus of claim 1, wherein the inward facing layer of the belt is made of polyuretan reinforced by nylon fibres arranged in a longitudinal direction of the belt.

4. The apparatus of claim 1, wherein the driving means for the belt comprises one or more hydraulic motors with means for continuously varying their speed of rotation.

5. Apparatus according to claim 1 wherein the pile height of the coir mat lies within a range of 1 to 1 ½ inches, the inner facing layer of said belt being formed of polyurethan reinforced by nylon fibers extending longitudinally of the belt, said driving means including a hydraulic motor and having means for continuously varying the speed of rotation of the drums, a concrete block underlying said plate and supported on said frame by said resilient mounting means, said plate including a polished sheet of stainless steel supported by said concrete block along its supper surface and underlying said upper belt portion.

* * * * *